United States Patent
Aepli

(10) Patent No.: US 10,106,681 B2
(45) Date of Patent: Oct. 23, 2018

(54) POLYAMIDE MOLDING COMPOUND AND USE THEREOF

(71) Applicant: EMS-PATENT AG, Domat/Ems (CH)

(72) Inventor: Etienne Aepli, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 203 days.

(21) Appl. No.: 15/032,978

(22) PCT Filed: Dec. 16, 2014

(86) PCT No.: PCT/EP2014/077880
§ 371 (c)(1),
(2) Date: Apr. 28, 2016

(87) PCT Pub. No.: WO2015/091429
PCT Pub. Date: Jun. 25, 2015

(65) Prior Publication Data
US 2016/0355679 A1    Dec. 8, 2016

(30) Foreign Application Priority Data

Dec. 20, 2013 (EP) .................................... 13199136

(51) Int. Cl.
| | |
|---|---|
| *C08L 77/06* | (2006.01) |
| *C08K 3/24* | (2006.01) |
| *C08K 3/32* | (2006.01) |
| *C08K 7/14* | (2006.01) |
| *C08L 71/12* | (2006.01) |

(52) U.S. Cl.
CPC ............... *C08L 77/06* (2013.01); *C08K 3/24* (2013.01); *C08K 3/32* (2013.01); *C08K 7/14* (2013.01); *C08K 2003/328* (2013.01); *C08L 71/126* (2013.01)

(58) Field of Classification Search
CPC ......... C08L 77/06; C08L 71/126; C08K 3/24; C08K 3/32; C08K 7/14; C08K 2003/328
USPC ........................................................ 524/407
See application file for complete search history.

(56) References Cited

U.S. PATENT DOCUMENTS

| | | |
|---|---|---|
| 3,306,874 A | 2/1967 | Hay et al. |
| 3,306,875 A | 2/1967 | Hay |
| 3,378,505 A | 4/1968 | Hay et al. |
| 3,639,656 A | 2/1972 | Bennett |
| 3,661,848 A | 5/1972 | Cooper et al. |
| 5,717,018 A | 2/1998 | Magerstedt et al. |
| 8,309,640 B2 * | 11/2012 | Li .............................. C08K 3/34 524/404 |
| 2003/0109612 A1 | 6/2003 | Seidel et al. |
| 2009/0048373 A1 | 2/2009 | Clauss et al. |

FOREIGN PATENT DOCUMENTS

| | | |
|---|---|---|
| EP | 1 274 288 A1 | 1/2003 |
| EP | 2 676 799 A1 | 12/2013 |
| JP | 2004-217756 A | 8/2004 |
| JP | 2011-132550 A | 7/2011 |
| JP | 2017-206590 A | 11/2017 |
| WO | 2005/103113 A1 | 11/2005 |
| WO | 2009/024496 A2 | 2/2009 |
| WO | 2009/141800 A2 | 11/2009 |
| WO | 2012/056416 A1 | 5/2012 |
| WO | 2012/128219 A1 | 9/2012 |
| WO | 2013/076314 A1 | 5/2013 |

* cited by examiner

*Primary Examiner* — Kelechi C Egwim
(74) *Attorney, Agent, or Firm* — Sughrue Mion, PLLC

(57) ABSTRACT

Thermoplastic, flameproof plastic molding materials are described having improved mechanical properties and improved surface properties, in particular for use in LDS. The thermoplastic molding compound consists of: (A) 30-84.9% by weight of a thermoplastic polymer mixture, comprising (A1) 50-90% by weight of a partially aromatic, partially crystalline polyamide or a mixture of such polyamides; (A2) 5-50% by weight of a polyphenylether or a mixture of such polyphenylethers; (A3) 0-40% by weight of a partially crystalline, aliphatic polyamide, wherein (A1)-(A3) add up to 100% by weight of component (A); (B) 15-60% by weight of glass fibers; (C) 0.1%-10% by weight of a LDS additive or a mixture of LDS additives, wherein at least one LDS additive is composed entirely or partially of inorganic compounds of copper and/or tin; (D) 0-40% by weight of a particulate filler different from (C); (F) 0-5% by weight of other additional additives; wherein the sum of (A)-(E) amounts to 100% by weight.

39 Claims, No Drawings

POLYAMIDE MOLDING COMPOUND AND USE THEREOF

CROSS REFERENCE TO RELATED APPLICATIONS

This application is a National Stage of International Application No. PCT/EP2014/077880 filed Dec. 16, 2014, claiming priority based on European Patent Application No. 13 199 136.6 filed Dec. 20, 2013, the contents of all of which are incorporated herein by reference in their entirety.

TECHNICAL FIELD

The present invention relates to thermoplastic polyamide molding compositions having improved mechanical properties and high gloss. Besides polyamide, the molding compositions comprise polyphenylene ethers and glass fibers and also an LDS additive. Moldings produced from them are reflow-solderable and can be subjected, following partial irradiation, to targeted metallization. The molding compositions of the invention find use in particular for the production of injection-molded interconnect devices.

PRIOR ART

Interconnect devices made from thermoplastics have the advantage over existing such devices of improved design freedom, of effective environmental compatibility, and of the rationalization potential relating to the process of producing the end product. The integration of electrical and mechanical functions in one injection molding may lead to miniaturization of the assembly. Moreover, entirely new functions can be realized, and virtually any desired forms can be designed.

EP-A-1 274 288 discloses additive laser structuring technology (Laser Direct Structuring, LDS), in which a laser is used to structure the molding that is produced by the standard injection molding process and that has particular physical properties, being based, for example, on seedable PBT. Through this technology, regions on the surface of the plastic that are later to carry the conduction tracks are partially seeded with metal atoms, atop which subsequently a metal layer grows in chemically reductive metallizing baths. The metal seeds come about by breakdown of metal compounds present in ultrafinely divided form in the carrier material. Unirradiated regions of the plastic remain unchanged in the metallizing bath.

WO-A-2013/076314 describes thermoplastic molding compositions which are directly laser structurable and which comprise a mixed metal oxide as LDS additive, based on tin and a further metal from a defined group, said document demonstrating, using unreinforced molding compositions of polycarbonate or polycarbonate/ABS blends, that these molding compositions possess high whiteness and that the metallization can be improved by increasing the fraction of anitmonoxide.

WO-A-2012/056416 indicates, for unreinforced and non-flame-retarded polycarbonate/ABS blends, that the addition of titanium dioxide can lead, irrespective of the type of LDS additive used, to molding compositions with good whiteness.

WO-A-2009/141800 discloses thermoplastic molding compositions for LDS structuring with a ceramic filler.

EXPOSITION OF THE INVENTION

On this basis it was an object of the present invention to provide thermoplastic polyamide molding compositions suitable for the MID (Molded Interconnect Devices) technology, and more particularly compositions which as well as glass fibers also comprise LDS additives, and which can be used to produce moldings having good mechanical properties, more particularly with high stiffness, high tensile strength, and good impact toughness, and also high gloss, these moldings being reliably solderable without blisters. Furthermore, the moldings are to be readily metallizable after laser irradiation, and the conductor tracks are to exhibit effective adhesion on the polymer substrate.

The thermal and mechanical properties and also the associated fields of use of these interconnect devices are determined first and foremost by the parent thermoplastic molding composition. Polyamides are presently widespread as structural elements for the interior and exterior, this being attributable substantially to the outstanding (thermo)mechanical properties, not least under different climatic conditions.

An improvement in the mechanical properties, such as strength and stiffness, can be achieved in particular through the addition of fibrous reinforcing materials, such as glass fibers or carbon fibers. In many cases, along with the glass fibers, particulate fillers are used as well, whether in order to color the molding compositions with inorganic pigments or to undertake other specific modifications to properties.

Generally speaking, however, the addition of particulate fillers, including the LDS additives, for example, to the glass fiber-reinforced molding compositions significantly impairs the mechanical properties—in particular, tensile strength, elongation at break, and impact toughness are normally considerably reduced. Moreover, the surface quality as well, especially the gloss, deteriorates.

An unexpected result of the specific constitution of the molding compositions of the invention, achieved in spite of the combination of fibrous and particulate fillers, is that moldings produced from these molding compositions, as well as other positive properties, have good mechanical properties and high surface quality, and are reliably solderable in a reflow soldering operation.

The invention specifically relates to a polyamide molding composition, particularly with high stiffness, tensile strength, impact toughness, and gloss, as claimed in claim 1, consisting more particularly of:

(A) 30-84.9 wt % of a thermoplastic polymer mixture consisting of
  (A1) 50-90 wt % or 55-90 wt % of a semiaromatic, semicrystalline polyamide or of a mixture of such polyamides,
  (A2) 5-50 wt % or 10-45 wt % of a polyphenylene ether or of a mixture of such polyphenylene ethers,
  (A3) 0-40 wt % of a semicrystalline, aliphatic polyamide,
  (A1)-(A3) adding up to 100 wt % of component (A),
(B) 15-60 wt % of glass fibers;
(C) 0.1-10 wt % of LDS additive or of a mixture of LDS additives, at least one LDS additive being composed wholly or partly of inorganic compounds of copper and/or of tin;
(D) 0-40 wt % of particulate filler other than (C);
(E) 0-5 wt %, preferably 0-2 wt %, of further, different additives;
the sum of (A)-(E) making up 100 wt %.

Typically the sum of (A2) and (A3) accounts for 10 to 50 wt % of component (A).

Preferentially in this case the fraction of component (A) within the sum of (A)-(E) in the area of (A) is situated in the range of 37-80.5 wt %, preferably in the range of 49-79 wt %.

The fraction of component (B) is preferentially in the range of 18-55 wt %, preferably in the range of 20-45 or 25-40 wt %, again based in each case on the sum of (A)-(E).

The fraction of component (C) is preferentially in the range of 0.5-8 wt %, preferentially in the range of 1-6 wt %, based in each case on the sum of (A)-(E).

Component (A1) comprises semicrystalline, semiaromatic polyamides which preferentially possess a glass transition temperature in the range from 90 to 150° C., preferably in the range from 110 to 140° C., and more particularly in the range from 115 to 135° C. The melting point of the polyamide (A1) is in the range from 255 to 330° C., preferably in the range from 270 to 325° C., and more particularly in the range from 280 to 320° C. The semicrystalline, semiaromatic polyamides of component (A1) preferably possess enthalpies of fusion determined by DSC in accordance with ISO 11357 in the range of 25-80 J/g, more preferably in the range of 30-70 J/g.

Preferred semiaromatic, semicrystalline polyamides here are prepared from a) 30 to 100 mol %, more particularly 50 to 100 mol %, of terephthalic acid and/or naphthalenedicarboxylic acid and also 0 to 70 mol %, more particularly 0 to 50 mol %, of at least one aliphatic dicarboxylic acid having 6 to 12 carbon atoms, and/or 0 to 70 mol %, more particularly 0 to 50 mol %, of at least one cycloaliphatic dicarboxylic acid having 8 to 20 carbon atoms, and/or 0 to 50 mol % of isophthalic acid, based on the total amount of the dicarboxylic acids, b) 80 to 100 mol % of at least one aliphatic diamine having 4-18 carbon atoms, preferably having 6 to 12 carbon atoms, and also 0 to 20 mol % of at least one cycloaliphatic diamine, preferably having 6 to 20 carbon atoms, such as PACM, MACM, IPDA, for example, and/or 0 to 20 mol % of at least one araliphatic diamine, such as MXDA and PXDA, for example, based on the total amount of the diamines, and also optionally c) aminocarboxylic acids and/or lactams each having 6 to 12 carbon atoms.

According to one preferred embodiment, the semiaromatic polyamide of component (A1) here is formed on the basis of at least 55 mol %, more particularly of at least 65 mol %, of terephthalic acid and at least 80 mol %, preferably at least 90 mol %, more particularly at least 95 mol % of aliphatic diamines having 4 to 18 carbon atoms, preferably having 6-12 carbon atoms, and optionally further aliphatic, cycloaliphatic, and aromatic dicarboxylic acids and also lactams and/or aminocarboxylic acids. Further aromatic dicarboxylic acids which can be used, apart from terephthalic acid, are isophthalic acid and naphthalenedicarboxylic acid. Suitable aliphatic and cycloaliphatic dicarboxylic acids which can be used as well as terephthalic acid possess 6 to 36 carbon atoms and are employed in a fraction of at most 70 mol %, more particularly in a fraction of at most 50 mol %, based on the total amount of the dicarboxylic acids.

It is preferred, moreover, for the stated aromatic dicarboxylic acids of the semiaromatic polyamide of component (A1) to be selected from the following group: terephthalic acid, isophthalic acid, and mixtures thereof.

According to a further preferred embodiment, the stated—for example—aliphatic dicarboxylic acids of the semiaromatic polyamide of component (A1) that can be used apart from terephthalic acid are selected from the group of adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and dimer fatty acid (C36).

Particular preference is given to adipic acid, sebacic acid, and dodecanedioic acid. Dicarboxylic acids which are preferably used apart from terephthalic acid accordingly: isophthalic acid, adipic acid, sebacic acid, and dodecanedioic acid, or a mixture of such dicarboxylic acids. Particular preference is given to polyamides (A1) based exclusively on terephthalic acid as dicarboxylic acid. According to a further preferred embodiment, the stated aliphatic diamines of the semiaromatic polyamide of component (A1) are selected from the group of 1,4-butanediamine, 1,5-pentanediamine, 1,6-hexanediamine, 1,7-heptanediamine, 1,8-octanediamine, 1,9-nonanediamine, methyl-1,8-octanediamine, 1,10-decanediamine, 1,11-undecanediamine, 1,12-dodecanediamine, or a mixture of such diamines, with preference being given to 1,6-hexanediamine, 1,10-decanediamine, 1,12-dodecanediamine, or a mixture of such diamines, and particular preference to 1,6-hexanediamine and 1,10-decanediamine. Besides the aliphatic diamines, it is possible for cycloaliphatic and/or araliphatic diamines to be replaced, in a concentration of 0 to 20 mol %, based on the total amount of diamines.

With particular preference polyamides (A1) are formed from the following components:

(A1_a): Dicarboxylic acids: 50-100 mol % of aromatic terephthalic acid and/or naphthalenedicarboxylic acid, based on the total amount of dicarboxylic acids present, 0-50 mol % of an aliphatic dicarboxylic acid, preferably having 6 to 12 carbon atoms, and/or of a cycloaliphatic dicarboxylic acid having preferably 8 to 20 carbon atoms, and/or isophthalic acid;

(A1_b): Diamines: 80-100 mol % of at least one aliphatic diamine having 4-18 carbon atoms, preferably having 6 to 12 carbon atoms, based on the total amount of diamines present, 0-20 mol % of cycloaliphatic diamines, preferably having 6 to 20 carbon atoms, such as PACM, MACM, IP-DA, for example, and/or araliphatic diamines, such as MXDA and PXDA, for example, the percentage molar amount of dicarboxylic acids making 100% and the percentage molar amount of diamines making 100% in the high-melting polyamides, and optionally from:

(A1_c): Aminocarboxylic acids and/or lactams, comprising lactams having preferably 6 to 12 carbon atoms, and/or aminocarboxylic acids having preferably 6 to 12 carbon atoms.

Whereas components (A1_a) and (A1_b) are preferably used largely equimolarly, the concentration of (A1_c) is preferably not more than 30 wt %, more preferably not more than 20 wt %, more particularly not more than 15 wt %, based in each case on the sum of (A1_a) to (A1_c).

Additionally to the largely equimolarly employed components (A1_a) and (A1_b), it is possible to use dicarboxylic acids (A1_a) or diamines (A1_b) to regulate the molar mass or to compensate losses of monomer during polyamide production, meaning that in its entirety the concentration of a component (A1_a) or (A1_b) may predominate.

Suitable cycloaliphatic dicarboxylic acids are the cis- and/or trans-cyclohexane-1,4-dicarboxylic acid and/or cis- and/or trans-cyclohexane-1,3-dicarboxylic acid (CHDA). The abovementioned aliphatic diamines that are generally used may be replaced in a minor amount of not more than 20 mol %, of preferably not more than 15 mol % and more particularly not more than 10 mol %, based on the total amount of the diamines, by other diamines. As cycloaliphatic diamines it is possible for example to use cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylmethane (MACM). Araliphatic diamines that may be mentioned include m-xylylenediamine (MXDA) and p-xylylenediamine (PXDA). Additionally to the dicarboxylic acids and diamines described it is possible to use, as well, lactams and/or aminocarboxylic acids as polyamide-forming components (component (A1_c)). Suitable compounds are, for example, caprolactam (CL), α,ω-aminocaproic acid, α,ω-aminononanoic acid, α,ω-aminoundecanoic acid (AUA), laurolactam (LL), and α,ω-aminododecanoic acid (ADA). The concentration of the aminocarboxylic acids and/or lactams used together with the components (A1_a) and (A1_b) is not more than 20 wt %, preferably not more than 15 wt %, and more preferably not more than 12 wt %, based on the sum of the components (A1a) to (A1c). Especially preferred are lactams and/or α,ω-amino acids having 4, 6, 7, 8, 11 or 12 C atoms. These are the lactams pyrrolidin-2-one (4 C atoms), ε-caprolactam (6 C atoms), enantholactam (7 C atoms), caprylolactam (8 C atoms), laurolactam (12 C atoms), and, respectively, the α,ω-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid. In one particularly preferred embodiment, component (A1) is free from caprolactam or aminocaproic acid or free from any aminocarboxylic acid or any lactam. In order to regulate the molar mass, the relative viscosity and/or the fluidity or the MVR it is possible to admix the batch and/or the precondensate (prior to the postcondensation) of chain transfer agents in the form of monocarboxylic acids or monoamines. Aliphatic, cycloaliphatic or aromatic monocarboxylic acids or monoamines with chain transfer agent suitability are acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)-propylamine, methylcyclohexylamine, dimethylcyclohexylamine, benzylamine, 2-phenylethyl-amine, 2,2,6,6-tetramethylpiperidin-4-amine, 1,2,2,6,6-pentamethylpiperidin-4-amine, 4-amino-2,6-di-tert-butylphenol, etc. The chain transfer agents can be utilized individually or in combination. It is also possible to use, as chain transfer agents, other monofunctional compounds which are able to react with an amino group or acid group, such as anhydrides, isocyanates, acid halides, or esters. The typical amount in which the chain transfer agents are used is between 10 and 200 mmol per kg of polymer.

The semiaromatic copolyamides (A1) may be prepared by methods that are known per se. Suitable methods have been described in various places, and a number of the possible processes discussed in the patent literature will be indicated below; the disclosure content of the documents identified hereinafter is expressly included in the disclosure content of the present specification with regard to the process for preparing the polyamide of component (A1) of the present invention: DE-A-195 13 940, EP-A-0 976 774, EP-A-0 129 195, EP-A-0 129 196, EP-A-0 299 444, U.S. Pat. No. 4,831,106, U.S. Pat. No. 4,607,073, DE-A-14 95 393 and U.S. Pat. No. 3,454,536.

Specific representatives of the polyamides (A1) of the invention are as follows: PA 4T/4I, PA 4T/6I, PA 5T/5I, PA 6T/6, PA 6T/6I, PA 6T/6I/6, PA 6T/66, 6T/610, 6T/612, PA 6T/10T, PA 6T/10I, PA 9T, PA 10T, PA 12T, PA 10T/10I, PA10T/106, PA10T/610, PA10T/612, PA10T/66, PA10T/6, PA10T/1010, PA10T/1012, PA10T/12, PA10T/11, PA 6T/9T, PA 6T/12T, PA 6T/10T/6I, PA 6T/6I/6, PA 6T/6I/12, and mixtures thereof;

with more particular preference the semiaromatic polyamide of component (A1) is selected from the following group: PA 6T/6I, PA 6T/10, PA 6T/10T/6I, and mixtures thereof. Preferred polyamides (A1) comprise 6T units, more particularly at least 10 wt % of 6T units. Preferred in accordance with the invention accordingly as polyamides (A1) are the following partially aromatic copolyamides in particular:

semicrystalline polyamide 6T/6I with 55 to 75 mol % hexamethyleneterephthalamide units and 25 to 45 mol % hexamethyleneisophthalamide units;

semicrystalline polyamide 6T/6I with 62 to 73 mol % hexamethyleneterephthalamide units and 25 to 38 mol % hexamethyleneisophthalamide units;

semicrystalline polyamide 6T/6I with 70 mol % hexamethyleneterephthalamide units and 30 mol % hexamethyleneisophthalamide units;

semicrystalline polyamide prepared from at least 50 mol % terephthalic acid and at most 50 mol % isophthalic acid, more particularly from 100 mol % terephthalic acid, and also from a mixture of at least two diamines selected from the group of hexamethylenediamine, nonanediamine, methyloctanediamine, and decanediamine;

semicrystalline polyamide prepared from 70-100 mol % terephthalic acid and 0-30 mol % isophthalic acid and also from a mixture of hexamethylenediamine and dodecanediamine;

semicrystalline polyamide prepared from at least 50 mol % terephthalic acid and at most 50 mol % dodecanedioic acid and also from a mixture of at least two diamines selected from the group of hexamethylenediamine, nonanediamine, methyloctanediamine, and decanediamine;

semicrystalline polyamide 6T/10T with 10 to 60 mol %, preferably 10 to 40 mol %, hexamethyleneterephthalamide (6T) units and 40 to 90 mol %, preferably 60 to 90 mol %, decamethyleneterephthalamide (10T) units;

semicrystalline polyamide 6T/10T/6I with 50 to 90 mol %, preferably 50-70 mol % hexamethyleneterephthalamide (6T) and 5 to 45 mol %, preferably 10-30 mol %, hexamethyleneisophthalamide (6I) units and 5 to 45 mol %, preferably 20-40 mol %, decamethyleneterephthalamide (10T) units;

semicrystalline polyamide 6T/6I/6 with 60 to 85 mol % hexamethyleneterephthalamide (6T) and 15 to 40 mol % hexamethyleneisophthalamide (6I) units, additionally containing 5-15 wt % caprolactam.

The semiaromatic, semicrystalline polyamide (A1) has a solution viscosity $\eta_{rel}$, measured according to DIN EN ISO 307 on solutions of 0.5 g of polymer in 100 ml of m-cresol at a temperature of 20° C., of not more than 2.6, preferably not more than 2.3, more particularly not more than 2.0. Preferred polyamides (A1) have a solution viscosity $\eta_{rel}$ in the range from 1.45 to 2.3, more particularly in the range from 1.5 to 2.0 or 1.5 to 1.8.

The polyamides (A1) of the invention can be prepared on typical polycondensation lines via the operating sequence of precondensate and postcondensation. For the polycondensation, the chain transfer agents described are used preferably for regulating the viscosity. The viscosity may additionally be adjusted through the use of an excess of diamine or of dicarboxylic acid.

The polyphenylene ethers used in accordance with the invention as component (A2) are inherently known when considered per se and may be prepared, for example, by customary processes, from phenols disubstituted in ortho-position by alkyl groups, by means of oxidative coupling (cf. U.S. Pat. No. 3,661,848, U.S. Pat. No. 3,378,505, U.S. Pat. No. 3,306,874, U.S. Pat. No. 3,306,875 and U.S. Pat. No. 3,639,656). Utilized customarily for the preparation are catalysts based on heavy metals such as copper, manganese or cobalt in combination with other substances such as secondary amines, tertiary amines, halogens or combinations thereof. Suitable polyphenylene ethers are, for example, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether or copolymers, such as those containing 2,3,6-trimethylphenol, and also mixtures of the stated polyphenylene ethers.

Preference is given to poly(2,6-dimethyl-1,4-phenylene) ether optionally in combination with 2,3,6-trimethylphenol units. The polyphenylene ethers may be used in the form of homopolymers, copolymer, graft copolymers, block copolymer or ionomers.

Suitable polyphenylene ethers generally have an intrinsic viscosity in the range from 0.1 to 0.6 dl/g, measured in chloroform at 25° C. This corresponds to a molecular weight $M_n$ (number average) of 3000 to 40000 and to a weight-average molecular weight $M_w$ of 5000 to 80000. It is possible to use a combination of a high-viscosity with a low-viscosity polyphenylene ether. The proportion of the two polyphenylene ethers with different viscosities is dependent on the viscosities and on the targeted physical properties. The mixtures of the PPE components (A2) with the polyamide (A1) and optionally with the polyamide (A3), according to the invention, comprise preferably 10-46 wt %, more preferably 15 to 45 or 15 to 40 wt %, of polyphenylene ethers, based in each case on the entirety of component A. For better compatibility, it is possible as part of component (A2) to use compatibilizers in the form of polyfunctional compounds that interact with the polyphenylene ether, with the polyamide or with both. Acting as a compatibilizer of this kind may be, for example, a polyphenylene ether grafted with maleic anhydride. The interaction may be chemical (by grafting, for example) and/or physical (by influence of the surface properties of the disperse phase, for example). Component (A2) accordingly comprises polyphenylene ethers alone, polyphenylene ethers alone that have been grafted or provided with reactive groups and modified for compatibility with component (A1), more particularly polyphenylene ethers alone that have been grated with maleic anhydride, or else a mixture of polyphenylene ether and polyphenylene ether-g-maleic anhydride.

The polyphenylene ethers of component (A2) that have been modified for compatibility with component (A1) contain carbonyl, carboxyl, carboxylic acid, acid anhydride, acid amide, acid imide, carboxylic ester, carboxylate, amino, hydroxyl, epoxy, oxazoline, urethane, urea, lactam or halobenzyl groups. The modified PPE used as component (A2) is preferably prepared by modifying unmodified PPE with α,β-unsaturated dicarbonyl compounds, monomers containing amide or lactam groups and having a polymerizable double bond in conjunction with radical initiators, as is described in EP0654505A1, for example.

Component (A2) preferentially possesses constituents having acid anhydride groups, which are introduced by thermal or radical reaction of the main-chain polymer with an unsaturated dicarboxylic anhydride, an unsaturated dicarboxylic acid or an unsaturated monoalkyl dicarboxylate, in a concentration which is sufficient for effective attachment to the polyamide, a purpose for which reagents selected from the following group are preferentially employed: maleic acid, maleic anhydride, monobutyl maleate, fumaric acid, aconitic acid and/or itaconic anhydride.

Preferably 0.05 to 5.0 wt % of an unsaturated anhydride are grafted onto the impact component as constituent of (A2) and/or (A3), or the unsaturated dicarboxylic anhydride or precursor thereof is grafted on together with a further unsaturated monomer. In general the degree of grafting is preferentially in a range of 0.1-3.0%, especially preferably in the range of 0.1-1.5 or 0.2-0.8%. Particular preference is given to using polyphenylene ethers with maleic anhydride grafting.

The polymers used in accordance with the invention as component (A3), which are different from (A1) and (A2), are semicrystalline aliphatic polyamides. The polyamides (A3) are preferably not based on cycloaliphatic diamines and/or cycloaliphatic dicarboxylic acids. In relation to the entirety of component (A), the amount of component (A3) is in a range from 0 to 40 wt %, preferably of 5 to 35 wt %, and more preferably in the range from 5 to 30 wt %. Within component (A), the ratio of (A2) to (A3) is preferably in the range from 4:1 to 1:4 and more preferably in the range from 4:1 to 1:2. It is especially preferred if the amount of (A3) within the component of (A) is less than or equal to the amount of component (A2).

Component (A3) is preferentially selected from the following group: polyamide 6, polyamide 10, polyamide 11, polyamide 12, polyamide 1212, polyamide 1012, polyamide 1210, polyamide 46, polyamide 66, polyamide 612, polyamide 126, polyamide 106, polyamide 610, polyamide 1010, polyamide 614, polyamide 618, polyamide 1014, polyamide 1018, polyamide 1214, polyamide 1218, and also copolyamides or mixtures thereof.

Especially preferred are polyamide 6, polyamide 66, polyamide 612, polyamide 106, and polyamide 610.

In another embodiment, preferably 0.05 to 5.0 wt % of acrylic acid, methacrylic acid, maleic acid, maleic anhydride, monobutyl maleate, fumaric acid, aconitic acid and/or itaconic anhydride, or generally an unsaturated anhydride, are grafted on to component (A2), to component (A3), or to a mixture of components (A2) and (A3), or the unsaturated dicarboxylic anhydride or precursor thereof is grafted on together with a further unsaturated monomer. In general the degree of grafting is preferentially in a range of 0.1-3 wt %, especially preferably in the range of 0.2-2.5 or 0.5-2 wt %. Particular preference is given to using components (A2) grafted with maleic anhydride, or mixtures of (A2) and (A3) grafted with maleic anhydride. It is preferred accordingly for components (A2) and (A3) to be grafted in unison before being combined with the remaining components (A1) and (B) and (C) and also optionally (D) and/or (E).

The molding compositions further comprise 15 to 60 wt % of glass fibers (component B), which are used, for example, in the form of short fibers (e.g., chopped glass with a length of 0.2-20 mm) or continuous fibers (rovings). The glass fibers (B) may have different cross-sectional areas, with preference being given to glass fibers having a circular cross section (round fibers) and with a noncircular cross section (flat fibers); mixtures of these types may also be used.

Glass fibers with a circular cross section, i.e., round glass fibers, preferably have a diameter in the range from 5-20 µm, preferably in the range of 6-13 µm, and more preferably in the range of 6-10 µm. They are employed preferably in the form of short glass fiber (chopped glass with a length of 0.2 to 20 mm, preferably 2-12 mm).

In the case of the flat glass fibers, these being glass fibers with a noncircular cross-sectional area, preference is given to using those having a dimension ratio of the principal cross-sectional axis to the secondary cross-sectional axis situated perpendicular thereto of more than 2.5, preferably in the range of 2.5 to 6, more particularly in the range from 3 to 5. These so-called flat glass fibers preferably have an oval, elliptical, constricted elliptical (cocoon fiber), polygonal, rectangular or virtually rectangular cross-sectional area. Another characterizing feature of the flat glass fibers used is that the length of the principal cross-sectional axis is preferably in the range from 6 to 40 µm, more particularly in the range from 15 to 30 µm, and the length of the secondary cross-sectional axis is in the range from 3 to 20 µm, more particularly in the range from 4 to 10 µm. The flat glass fibers in this case preferably have a very high packing density, meaning that the cross-sectional area of the glass fills an imaginary rectangle, surrounding the cross section of the glass fiber as exactly as possible, to an extent of at least 70%, preferably at least 80%, and especially preferably at least 85%.

In order to reinforce the molding compositions of the invention it is also possible to use mixtures of glass fibers with circular and noncircular cross sections, in which case the fraction of flat glass fibers is preferentially predominant, thus accounting for more than 50 wt % of the total mass of the fibers.

Component (B) is preferably selected from the group consisting of the following: E glass fibers (which according to ASTM D578-00 consist of 52-62% silicon dioxide, 12-16% aluminum oxide, 16-25% calcium oxide, 0-10% borax, 0-5% magnesium oxide, 0-2% alkali metal oxides, 0-1.5% titanium dioxide and 0-0.3% iron oxide; they preferably have a density of 2.58±0.04 g/cm³, a modulus of elasticity in tension of 70-75 GPa, a tensile strength of 3000-3500 MPa, and an elongation at break of 4.5-4.8%), A glass fibers (63-72% silicon dioxide, 6-10% calcium oxide, 14-16% sodium and potassium oxides, 0-6% aluminum oxide, 0-6% boron oxide, 0-4% magnesium oxide), C glass fibers (64-68% silicon dioxide, 11-15% calcium oxide, 7-10% sodium and potassium oxides, 3-5% aluminum oxide, 4-6% boron oxide, 2-4% magnesium oxide), D glass fibers (72-75% silicon dioxide, 0-1% calcium oxide; 0-4% sodium and potassium oxides, 0.1% aluminum oxide, 21-24% boron oxide), basalt fibers (mineral fiber with the approximate composition: 52% $SiO_2$, 17% $Al_2O_3$, 9% CaO, 5% MgO, 5% $Na_2O$, 5% iron oxide, and further metal oxides), AR glass fibers (55-75% silicon dioxide, 1-10% calcium oxide, 11-21% sodium and potassium oxides, 0-5% aluminum oxide, 0-8% boron oxide, 0-12% titanium dioxide, 1-18% zirconium oxide, 0-5% iron oxide), and mixtures thereof.

A preferred embodiment of component (B) are high-strength glass fibers based on the ternary system of silicon dioxide-aluminum oxide-magnesium oxide or on the quaternary system of silicon dioxide-aluminum oxide-magnesium oxide-calcium oxide, in which the sum of the amounts of silicon dioxide, aluminum oxide and magnesium oxide is at least 78 wt %, preferably at least 87% and more preferably at least 92%, based on the overall glass composition.

Specific preference is given to a composition of 58-70 wt % silicon dioxide ($SiO_2$), 15-30 wt % aluminum oxide ($Al_2O_3$), 5-15 wt % magnesium oxide (MgO), 0-10 wt % calcium oxide (CaO) and 0-2 wt % further oxides, such as zirconium dioxide ($ZrO_2$), boron oxide ($B_2O_3$), titanium dioxide ($TiO_2$) or lithium oxide ($Li_2O$), for example. In another embodiment the composition of the high-strength glass fiber is 60-67 wt % silicon dioxide ($SiO_2$), 20-28 wt % aluminum oxide ($Al_2O_3$), 7-12 wt % magnesium oxide (MgO), 0-9 wt % calcium oxide (CaO) and 0-1.5 wt % other oxides, such as zirconium dioxide ($ZrO_2$), boron oxide ($B_2O_3$), titanium dioxide ($TiO_2$), lithium oxide ($Li_2O$), for example.

It is especially preferable for the composition of the high-strength glass fiber to be as follows: 62-66 wt % silicon dioxide ($SiO_2$), 22-27 wt % aluminum oxide ($Al_2O_3$), 8-12 wt % magnesium oxide (MgO), 0-5 wt % calcium oxide (CaO), 0-1 wt % other oxides, such as zirconium dioxide ($ZrO_2$), boron oxide ($B_2O_3$), titanium dioxide ($TiO_2$), lithium oxide ($Li_2O$), for example.

The high-strength glass fiber possesses a tensile strength of greater than or equal to 3700 MPa, preferably of at least 3800 or 4000 MPa, an elongation at break of at least 4.8%, preferably at least 4.9 or 5.0%, and a modulus of elasticity in tension of greater than 75 GPa, preferably of more than 78 or 80 GPa, these glass properties being determined on individual fibers (pristine single filament) having a diameter of 10 µm and a length of 12.7 mm at a temperature of 23° C. and a relative humidity of 50%. Specific examples of these high-strength glass fibers of component (B1) are S glass fibers from Owens Corning with 995 size, T glass fibers from Nittobo, HiPertex from 3B, HS4 glass fibers from Sinoma Jinjing Fiberglass, R glass fibers from Vetrotex, and S-1 and S-2 glass fibers from AGY.

The glass fibers used in accordance with the invention, for example, as rovings (continuous fibers) have a diameter (for round glass fibers) or a secondary cross-sectional axis (for flat glass fibers) of 8 to 20 µm, preferably of 12 to 18 µm, it being possible for the cross section of the glass fibers to be round, oval, elliptical, elliptical with constrictions, polygonal, rectangular or virtually rectangular. Particularly preferred are so-called flat glass fibers having a ratio of the cross-sectional axes, i.e., a ratio of principal to secondary cross-sectional axis, of 2.5 to 5. The continuous fibers may be produced from the types of glass described above, with preference being given to continuous fibers based on E glass and on the high-strength glass types. These continuous fibers are incorporated into the polyamide molding compositions of the invention by means of known techniques for producing long-fiber-reinforced rod pellets, more particularly by pultrusion techniques, in which the continuous fiber strand (roving) is impregnated completely with the polymer melt and then is cooled and chopped. The long-fiber-reinforced rod pellets obtained in this way, with a pellet length of preferably 3 to 25 mm, more particularly of 4 to 12 mm, can be processed further by the conventional processing techniques (such as injection molding or compression molding, for example) to form moldings.

Preferred as component (B) are glass fibers of E glass, with a noncircular cross section (flat fibers) and with an axial ratio of the principal cross-sectional axis to the secondary cross-sectional axis of at least 2.5, and/or high-strength glass fibers with a circular or noncircular cross section and a glass composition based essentially on the components silicon dioxide, aluminum oxide and magnesium oxide, with the fraction of magnesium oxide (MgO) being 5-15 wt % and the fraction of calcium oxide being 0-10 wt %.

As flat E glass fibers, the glass fibers of component (B) preferably have a density of 2.54-2.62 g/cm³, a modulus of elasticity in tension of 70-75 GPa, a tensile strength of 3000-3500 MPa, and an elongation at break of 4.5-4.8%, the mechanical properties having been determined on individual fibers having a diameter of 10 μm and a length of 12.7 mm at 23° C. and a relative humidity of 50%.

The glass fibers of the invention may be provided with a size which is suitable for thermoplastics, more particularly for polyamide, comprising an adhesion promoter based on an aminosilane or epoxysilane compound.

The fraction of component (C) is as mentioned preferably in the range of 0.5-8 wt %, more preferably in the range of 1-6 wt %.

Component (C) is preferably an LDS additive having a nonzero absorption coefficient for UV, VIS or IR radiation, which on exposure to electromagnetic radiation, preferably in the form of laser radiation, forms metal seeds which, in a chemical metallizing procedure, facilitate and/or enable and/or enhance the deposition of metal layers for the generation of conductor tracks at the irradiated locations on the surface of the molding, the LDS additive preferably having a capacity for absorption in the visible and infrared radiation regions, with an absorption coefficient of at least 0.05, preferably at least 0.1 and more particularly at least 0.2, and/or in that an absorber is provided which transmits the radiant energy to the LDS additive.

Component (C) is preferably an LDS additive having an average particle size (D50) in the range of 50-20000 nanometers, preferably 200 to 15000 nanometers and more preferably 300 to 5000 nanometers, and/or having an aspect ratio (ratio of length to diameter) of not more than 10, more particularly not more than 5. The D50 value, stated as a measure of the particle size, is a measure of the average particle size, with 50 volume percent of the sample being finer, and the other 50% of the sample coarser, than the D50 valve (median).

In one preferred embodiment component (C) comprises (or component C consists of) an LDS (Laser Direct Structuring) additive selected from the group of the metal oxides, more particularly those known as spinels with the general chemical formula $AB_2O_4$ 

where

A is a metal cation of valence 2, with A preferably being selected from the group consisting of the following: magnesium, copper, cobalt, zinc, tin, iron, manganese and nickel, and also combinations thereof;

B is a metal cation of valence 3, with B preferably being selected from the group consisting of the following: manganese, nickel, copper, cobalt, tin, titanium, iron, aluminum, and chromium, and also combinations thereof;

with more particular preference, the LDS additive is a copper iron spinel, a copper-containing magnesium aluminum oxide, a copper chromium manganese mixed oxide, a copper manganese iron mixed oxide, optionally in each case with oxygen defects, or salts and oxides of copper, such as, in particular, copper(I) oxide, copper(II) oxide, basic copper phosphates, copper hydroxide phosphate, copper sulfate, and also metal complex compounds, more particularly chelate complexes of copper, tin, nickel, cobalt, silver, and palladium, or mixtures of such systems, and/or selected more particularly from the following group: copper chromium manganese mixed oxides, copper manganese iron mixed oxides, copper chromium oxide, zinc iron oxide, cobalt chromium oxide, cobalt aluminum oxide, magnesium aluminum oxide, and also mixtures and/or surface-treated forms thereof, and/or forms thereof that have oxygen defects. Possible for example are systems as described in WO-A-2000/35259 or in Kunststoffe 92 (2002), 11, 2-7, for example.

Likewise preferred as component (C) is an LDS (Laser Direct Structuring) additive selected from the group of the metal oxides, mixed metal oxides, metal hydroxide oxides, metal sulfide oxides based on tin. Particularly preferred is tin oxide and doped tin oxide, in which case the doping may be with antimony, bismuth, molybdenum, aluminum, titanium, silicon, iron, copper, silver, palladium and cobalt. Preference more particularly is given to tin oxide doped with antimony, titanium or copper. Preference extends to mixtures of tin oxide and at least one further metal oxide, more particularly antimony oxide, as LDS additive. Further metal oxides used in this context are not only colorless metal oxides of high refractive index, such as titanium dioxide, antimony(III) oxide, zinc oxide, tin oxide and/or zirconium dioxide, in particular, but also colored metal oxides such as, for example, chromium oxide, nickel oxide, copper oxide, cobalt oxide, and especially iron oxide ($Fe_2O_3$, $Fe_3O_4$). More particular preference is given to using the mixture of tin oxide and antimony(III) oxide.

The doped tin oxides and/or metal oxide mixtures or tin oxide are formed preferably as layers on platelet-shaped substrates, more particularly phyllosilicates, such as, for example, synthetic or natural mica, talc, kaolin, glass platelets or silicon dioxide platelets. Preferred substrates with metal oxides are, in particular, mica or mica flakes. Other substrates contemplated include platelet-shaped metal oxides such as, for example, platelet-shaped iron oxide, aluminum oxide, titanium dioxide, silicon dioxide, LCPs (Liquid Crystal Polymers), holographic pigments or coated graphite platelets.

Particular preference is given to LDS additives based on mica, the mica surface being coated with metal-doped tin oxides. Especially preferred is antimony-doped tin oxide. Examples of commercially available LDS additives in accordance with the present invention are as follows: Lazerflair LS820, LS825, LS830 and Minatec 230 A-IR from Merck, Stanostat CP40W, Stanostat CP15G or Stanostat CP5C from Keeling&Walker, and Fabulase 322S, 330, 350 and 352 from Budenheim.

The particularly preferred LDS additives are as follows: copper chromite, copper hydroxide phosphate, and antimony-doped tin oxide, the latter finding use preferably in combination with mica.

Preferably the fraction of component (D) is in the range of 0-25 wt %, preferably in the range of 0-15 wt %, and more preferably in the range of 2-15 wt %. Talc, chalk or calcium carbonate, for example, may make it easier to generate metal seeds or may increase the adhesion of the conductor tracks on the substrate.

Particulate fillers of component (D) that are contemplated include all fillers known to the skilled person. These include, in particular, particulate fillers selected from the group consisting of talc (magnesium silicate), mica, silicates, quartz, wollastonite, kaolin, silicas, magnesium carbonate, magnesium hydroxide, chalk, ground or precipitated calcium carbonate, lime, feldspar, inorganic pigments, such as, for example, iron oxide or iron manganese oxide or, in particular, white pigments, such as barium sulfate, zinc oxide, zinc sulfide, lithopones and titanium dioxide (rutile, anatase), permanent-magnetic or magnetizable metals or alloys, hollow-sphere silicate fillers, aluminum oxide, boron nitride, boron carbide, aluminum nitride, calcium fluoride, and mixtures thereof. The fillers may also be in surface-treated form.

Component (D) is or consists preferentially exclusively of the inorganic white pigments, selected from the group of barium sulfate, zinc oxide, zinc sulfide, lithopones and titanium dioxide (rutile, anatase), with the white pigments preferentially possessing an average particle size (D50) in the range of 0.1-40 μm, preferably in the range of 0.1-20 μm, more particularly in the range of 0.1-10 μm. Zinc sulfide is particularly preferred. The metal oxides used as component (D) are different from components (C) and (E).

The thermoplastic polyamide molding compositions of the invention may of course further comprise customary adjuvants of component (E), which are common knowledge to the skilled person, in the form of the additives (E), which are selected preferably from the group consisting of the following: adhesion promoters, stabilizers, aging inhibitors, antioxidants, antiozonants, light stabilizers, UV stabilizers, UV absorbers, UV blockers, inorganic heat stabilizers, especially based on copper halides and alkali metal halides, organic heat stabilizers, conductivity additives, carbon black, optical brighteners, processing assistants, nucleating agents, crystallization accelerators, crystallization retarders, flow assistants, lubricants, mold release agents, compatibilizers, plasticizers, pigments, especially organic pigments, dyes other than component (D), marker substances, and mixtures thereof.

The invention further relates to a component (molding), more particularly a component with electrical conductor tracks, on the basis of a molding composition as set out above. Fields of use for the MID technology are in automotive engineering, industrial automation, medical engineering, the domestic appliance industry, consumer electronics, the telecommunications industry, metrology and analysis, mechanical engineering, and also air and space travel. The invention thus also relates indirectly to an article, more particularly an interconnect device, comprising a molding produced from the molding composition of the invention. In one embodiment the interconnect device is utilized in order to form an antenna.

Examples of such moldings are casings or casing parts for portable electronic devices, such as PDAs, mobile telephones, other telecommunications devices, casings or casing parts for personal computers, notebook computers, medical devices, such as hearing devices, for example, sensor technology, or RFID (radiofrequency identification) transponders or parts for the automotive sector, such as, for example, airbag module, multi-function steering wheel.

On account of the extensive possibilities for design with plastics injection molding, three-dimensional interconnect devices can be realized. Furthermore, typical mechanical functions can be integrated, such as mounts, guides, buttons, plugs or other connecting elements. Likewise possible are connectors for electrical and electronic applications and also for fuel systems. Further embodiments are specified in the dependent claims.

Further embodiments are specified in the dependent claims.

DESCRIPTION OF PREFERRED EMBODIMENTS

The invention is to be described hereinafter using specific working examples (B), and compared with the less highly performing systems of the prior art (VB). The working examples specified below serve to support the invention and to demonstrate the differences relative to the prior art, but they are not intended to limit the general subject matter of the invention, as it is defined in the claims.

Examples B1 to B9 and Comparative Examples VB1 and VB2

The components specified in Tables 2 and 3 are compounded in a twin-screw extruder from Werner and Pfleiderer having a screw diameter of 25 mm, with specified processing parameters (cf. Table 1). The polyamide pellets along with the adjuvants are metered into the intake zone, while the glass fiber is metered into the polymer melt via a side feeder 3 barrel units ahead of the die. Pelletization took place in the form of underwater pelletizing or hot chopping under water, where the polymer melt is pressed through a perforated die and pelletized immediately after emerging from the die, in a stream of water, using a rotating blade. After pelletizing and drying at 120° C. for 24 hours, the properties of the pellets were measured and the test specimens were produced.

The compounded formulations are injection-molded with an Arburg Allrounder 320-210-750 injection-molding machine to give specimens, with defined barrel temperatures for zones 1 to 4 and with a defined mold temperature (see Table 1).

TABLE 1

Compounding and injection molding conditions for examples B1-B9 and comparative examples VB1 and VB2

| Compounding/processing parameters | | B1-B9, VB1, VB2 |
|---|---|---|
| Compounding | Barrel temperatures | 350 |
| | Screw speed | 180 |
| | Throughput | 8 |
| Injection molding | Barrel temperatures | 340 |
| | Mold temperature | 80 |
| | Peripheral screw speed | 15 |

TABLE 2

Composition and properties of examples B1 to B4 and of comparative examples VB1 and VB2

| | Unit | VB1 | VB2 | B1 | B2 | B3 | B4 |
|---|---|---|---|---|---|---|---|
| Composition | | | | | | | |
| PA 6T/10T | wt % | 65.5 | 45.5 | 45.5 | 35.5 | 35.5 | 35.5 |
| PPE type A | wt % | | | 20 | 30 | 30 | 30 |
| PA 6I/6T | wt % | | 20 | | | | |
| Glass fiber type A | wt % | 30 | 30 | 30 | 30 | 30 | 30 |
| Glass fiber type B | wt % | | | | | | |

TABLE 2-continued

Composition and properties of examples B1 to B4 and of comparative examples VB1 and VB2

|  | Unit | VB1 | VB2 | B1 | B2 | B3 | B4 |
|---|---|---|---|---|---|---|---|
| LDS additive 1 | wt % | 4 | 4 | 4 | 4 |  |  |
| LDS additive 2 | wt % |  |  |  |  | 4 |  |
| LDS additive 3 | wt % |  |  |  |  |  | 4 |
| STAB | wt % | 0.5 | 0.5 | 0.5 | 0.5 | 0.5 | 0.5 |
| Properties |  |  |  |  |  |  |  |
| MET[(1)] | MPa | 9200 | 8400 | 9200 | 9500 | 9700 | 9700 |
| Tensile strength | MPa | 139 | 110 | 138 | 140 | 168 | 166 |
| Elongation at break | % | 2.0 | 2.2 | 2.3 | 2.3 | 2.4 | 2.5 |
| Impact strength 23° C. | kJ/m$^2$ | 25 | 32 | 36 | 37 | 68 | 64 |
| Notched impact strength 23° C. | kJ/m$^2$ | 4.5 | 5.1 | 5.1 | 5.2 | 9 | 8 |
| HDT A (1.8 MPa) | ° C. | 253 | 162 | 225 | 226 | 231 | 224 |
| HDT B (0.45 MPa) | ° C. | >280 | 258 | 260 | 262 | 268 | 263 |
| Gloss 85° |  | 82 | 75 | 90 | 92 | 93 | 94 |
| Solderability (plate thickness without blisters) | mm | 1.2 | 1.7 | 1.2 | 1.2 | 1.2 | 1.2 |
| Metallizability |  | + | ++ | ++ | ++ | ++ | ++ |

[(1)]MET = Modulus of elasticity in tension

TABLE 3

Composition and properties of examples B5 to B9

|  | Unit | B5 | B6 | B7 | B8 | B9 |
|---|---|---|---|---|---|---|
| Composition |  |  |  |  |  |  |
| PA 6T/10T | wt % | 35.5 | 35.5 | 35.5 | 35.5 | 35.5 |
| PPE type A | wt % | 30 | 30 | 20 | 15 | 20 |
| PPE type B | wt % |  |  | 10 | 15 | 10 |
| Glass fiber type A | wt % |  |  | 30 |  |  |
| Glass fiber type B | wt % | 30 | 30 |  | 30 | 30 |
| LDS additive 1 | wt % |  | 4 |  |  |  |
| LDS additive 2 | wt % | 4 |  | 4 | 4 | 4 |
| STAB | wt % | 0.5 | 0.5 | 0.5 | 0.5 | 0.5 |
| Properties |  |  |  |  |  |  |
| MET[(1)] | MPa | 9700 | 9800 | 9700 | 9800 | 9700 |
| Tensile strength | MPa | 145 | 170 | 165 | 172 | 171 |
| Elongation at break | % | 2.3 | 2.6 | 2.4 | 2.5 | 2.5 |
| Impact strength 23° C. | kJ/m$^2$ | 45 | 75 | 70 | 75 | 80 |
| Notched impact strength 23° C. | kJ/m$^2$ | 8 | 12 | 14 | 12 | 14 |
| HDT A (1.8 MPa) | ° C. | 224 | 232 | 230 | 234 | 233 |
| HDT B (0.45 MPa) | ° C. | 264 | 267 | 266 | 270 | 268 |
| Gloss 85° |  | 93 | 95 | 94 | 96 | 95 |
| Solderability (plate thickness without blisters) | mm | 1.2 | 1.2 | 1.7 | 1.2 | 1.2 |
| Metallizability |  | — | ++ | ++ | ++ | ++ |

[(1)]MET = Modulus of elasticity in tension

TABLE 4

Composition and properties of examples B10 to B16

|  |  | Unit | B10 | B11 | B12 | B13 | B14 | B15 | B16 |
|---|---|---|---|---|---|---|---|---|---|
| PA 6T/10T |  | wt % | 33.5 | 33.5 | 35.5 | 35.5 | 35.5 | 35.5 | 50.5 |
| PPE type C | PPE | wt % | 25.6 |  |  |  |  |  |  |
|  | PA66 | wt % | 6.4 |  |  |  |  |  |  |
| PPE type D | PPE | wt % |  | 6.4 |  |  |  |  |  |
|  | PA66 | wt % |  | 25.6 |  |  |  |  |  |
| PPE type E | PPE | wt % |  |  | 22.5 |  |  |  |  |
|  | PA66 | wt % |  |  | 7.5 |  |  |  |  |
| PPE type F | PPE | wt % |  |  |  | 7.5 |  |  |  |
|  | PA66 | wt % |  |  |  | 22.5 |  |  |  |
| PPE type G | PPE | wt % |  |  |  |  | 18.0 |  |  |
|  | PA66 | wt % |  |  |  |  | 12.0 |  |  |
| PPE | PPE | wt % |  |  |  |  |  | 30 | 15 |
| Glass fiber type A |  | wt % | 30 | 30 | 30 | 30 | 30 | 30 | 30 |
| LDS additive 1 |  | wt % | 4 | 4 | 4 |  | 4 | 4 | 4 |
| STAB |  | wt % | 0.5 | 0.5 | 0.5 | 0.5 | 0.5 | 0.5 | 0.5 |
| MET[(1)] |  | MPa | 9900 | 10000 | 10000 | 9900 | 10100 | 10000 | 10200 |
| Tensile strength |  | MPa | 141 | 142 | 144 | 136 | 142 | 145 | 148 |
| Elongation at break |  | % | 2.1 | 2.2 | 2.1 | 2.0 | 2.0 | 2.2 | 2.2 |

TABLE 4-continued

Composition and properties of examples B10 to B16

| | Unit | B10 | B11 | B12 | B13 | B14 | B15 | B16 |
|---|---|---|---|---|---|---|---|---|
| Impact strength 23° C. | kJ/m$^2$ | 36 | 39 | 32 | 40 | 35 | 38 | 38 |
| Notched impact strength 23° C. | kJ/m$^2$ | 5.4 | 5.1 | 5.0 | 5.2 | 5.0 | 5.5 | 5.5 |
| HDT A (1.8 MPa) | ° C. | 228 | 212 | 235 | 216 | 230 | 232 | 235 |
| HDT B (0.45 MPa) | ° C. | 260 | 245 | 262 | 244 | 260 | 262 | 264 |
| Gloss 85° | | 95 | 86 | 90 | 86 | 92 | 94 | 90 |
| Solderability (plate thickness without blisters) | mm | 1.2 | 1.7 | 1.2 | 1.7 | 1.2 | 1.2 | 1.2 |
| Metallizability | | ++ | + | ++ | + | ++ | ++ | + |

[1] MET = Modulus of elasticity in tension

Key, Materials:

PA6I/6T Amorphous, semiaromatic polyamide based on terephthalic acid (30 mol %), isophthalic acid (70 mol %) and 1,6-hexanediamine, having a glass transition temperature of 125° C. and a solution viscosity of 1.54.

PA 6T/10T Semicrystalline, semiaromatic polyamide based on 1,6-hexanediamine (15 mol %), 1,10-decanediamine (85 mol %) and terephthalic acid, having a melting point of 305° C. and a solution viscosity of 1.62.

PPE types A to H Mixtures of PA66 and PPE (poly(2,6-dimethyl-1,4-phenylene ether)) in the proportion as indicated in the table below, grafted with maleic anhydride (MAH content based in each case on the grafted mixture)

| PPE type | Fraction of PPE [parts by weight] | Fraction of PA66 [parts by weight] | MAH [parts by weight] |
|---|---|---|---|
| A | 50 | 50 | 2 |
| B | 50 | 50 | 0.2 |
| C | 80 | 20 | 2 |
| D | 20 | 80 | 2 |
| E | 75 | 25 | 2 |
| F | 25 | 75 | 2 |
| G | 60 | 40 | 2 |

PPE type A therefore corresponds to the Bondyram 6008 product, and PPE type B corresponds to the Bondyram 6009 product, both from Polyram.

PPE PPE (poly(2,6-dimethyl-1,4-phenylene ether)), grafted with maleic anhydride (MAH content: 1% based on the grafted PPE)

Glass fiber type A CPIC ECS 301 HP, 3 mm long, 10 μm in diameter, CPIC, China. (Glass fibers with circular cross section)

Glass fiber type B CPIC ECS 301 T, 3 mm long, 24 μm wide, 8 μm thick, aspect ratio of the cross-sectional axes=3, CPIC, China (flat glass fiber)

LDS additive 1 Shepherd Black 30C965 (The Shepherd Color Company), copper chromite ($CuCr_2O_4$), average particle size of 0.6 μm LDS additive 2 Fabulase 322 S, copper(II) hydroxide phosphate, Budenheim LDS additive 3 Fabulase 330, metal phosphate based on tin, Budenheim STAB Heat stabilization, N,N'-hexane-1,6-diylbis(3-(3,5-di-tert-butyl-4-hydroxyphenylpropionamide)), Irganox 1098, BASF The measurements were conducted in accordance with the following standards and on the following test specimens.

(Thermo)Mechanical Parameters:

The modulus of elasticity in tension was determined in accordance with ISO 527 with a tensioning speed of 1 mm/min, and the yield stress, tensile strength and elongation at break were determined in accordance with ISO 527 with a tensioning speed of 50 mm/min (unreinforced versions) or with a tensioning speed of 5 mm/min (reinforced versions) at a temperature of 23° C., the specimen used being an ISO tensile dumbbell, standard: ISO/CD 3167, type A1, 170×20/10×4 mm.

Impact strength and Charpy notched impact strength were measured in accordance with ISO 179 on the ISO test rod, standard: ISO/CD 3167, type B1, 80×10×4 mm at 23° C.

The thermal characteristics (melting temperature ($T_m$), enthalpy of fusion ($\Delta H_m$), glass transition temperature ($T_g$)) were determined on the pellets by ISO standard 11357-11-2. Differential scanning calorimetry (DSC) was carried out with a heating rate of 20° C./min.

The relative viscosity ($\eta_{rel}$) was measured according to DIN EN ISO 307 on 0.5 wt % strength m-cresol solutions at 20° C. The form of sample used is pellets.

The heat distortion resistance in the form of HDT A (1.8 MPa) and HDT B (0.45 MPa) was determined according to ISO 75 on ISO impact rods with dimensions of 80×10×4 mm.

Surface Properties, Gloss:

The gloss was determined on plates with dimensions of 80×80×1 mm, using a Minolta Multi Gloss 268 instrument, at an angle of 85° and at a temperature of 23° C. in accordance with ISO 2813.

Laser Structurability:

In order to assess the metallizing behavior, injection moldings (plate 60×60×2 mm) were structured using an Nd:YAG laser and thereafter subjected to electroless metallization in a copperizing bath. In the laser structuring, 18 adjacent regions measuring 5×7 mm on the surface of the molding were irradiated. Laser structuring took place using an LPKF Microline 3D laser at a wavelength of 1064 nm and an irradiation width of around 50 μm at a speed of 4 m/s. In the course of this structuring, variations were made both in the pulse frequency and in the power of the laser. For the specific pulse frequencies of 60, 80 and 100 kHz, the power was varied in each case in the range of 3-17 watts. Following the laser structuring, the moldings are subjected to a cleaning operation in order to remove laser processing residues. The moldings then pass in succession through ultrasound baths with surfactant and with deionized water. After cleaning, the moldings are metallized in a reductive copperizing bath (MacDermid MID Copper 100 B1) for 60-80 minutes.

Copper deposition on the areas irradiated by the laser here is in an average thickness of 3 to 5 μm.

Metallizability:

The metallizability was assessed visually as follows:

++: all 18 fields are each uniformly metallized and the deposited copper layer has an average thickness of 3 to 5 μm.

+: 15-17 fields are each uniformly metallized and the deposited copper layer has an average thickness of 3 to 5 μm (fields structured at minimal energy are inadequately metallized).

o: 12-14 fields are each uniformly metallized and the deposited copper layer has an average thickness of 3 to 5 μm.

−: less than 12 fields are each uniformly metallized and the deposited copper layer has an average thickness of 3 to 5 μm or unstructured regions (without irradiation) were metallized.

For all molded interconnect device (MID) technologies, chemical reductive copper deposition is the key initial metallizing operation which is decisive for the quality of the overall layer. It is therefore entirely adequate to assess the quality of the primary metal layer. In order to arrive at the completed MID part, generally nickel and subsequently a final layer of immersion gold will be deposited on the foundation of the first copper layer (primary layer). It will be appreciated that other metal layers as well, such as further layers of copper, palladium, tin or silver, for example, may also be applied to the primary layer.

Solderability:

Stepped plates with the following dimensions are produced by injection molding: length×width 60×60, with the plate height being implemented in five stairlike steps as follows: 1.2 mm, 1.7 mm, 2.2 mm, 2.7 mm and 3.2 mm. The stair steps are 60 mm wide and 12 mm deep. These stepped plates are conditioned at 85° C. and 85% relative humidity for 168 hours in an Allen 600 conditioning cabinet from Angelantoni Industrie s.p.a. (IT) as described in the Joint Industry Standard IPC/JEDEC J-STD-020D.1 for Moisture Sensitivity Level 1, SML 1. Thereafter, batches of three stepped plates are placed on a platen (single-sided temperature exposure) and are transported at a belt speed of 200 mm/min through a RO300FC reflow soldering system from Essemtec AG (CH). The heating zones are set to the temperatures listed in Table 5. In the case of test 2 (single-sided), the soldering profile for the plate step 1.7 mm thick is that prescribed, with a peak temperature of 260° C. The surface temperature in the case of the step 1.7 mm thick is 54 sec above 255° C. and 22 sec above 260° C. The outcome determined for the soldering test was the thickness of the test plate step without blisters, as minimum wall thickness, this result being entered into Tables 2 to 4.

VB1 has low elongation at break, impact strength and notched impact strength, and has a gloss which is too low. Using the amorphous polyamide 6T/6I (30:70) in VB2 does improve the elongation at break and the impact strength relative to VB1, but the tensile strength and the gloss deteriorate. There is also a fall in HDT A and B as a result of using the amorphous polyamide, to an extent such that reliable solderability is no longer ensured.

If an amorphous polyphenylene ether is then added to the semiaromatic, semicrystalline polyamide, there are unexpected increases in the elongation at break, the impact strength and the gloss, with the tensile strength at the same level. HDT A and B achieve a sufficient level to ensure reliable solderability.

A further improvement, especially in terms of tensile strength, elongation at break and also impact strength and notched impact strength, is achieved if, as in examples B3 and B4, the LDS additive copper chromite is replaced by copper-based or tin-based phosphates.

As indicated by a comparison of examples B2 with B5 or B3 with B6, the use of the preferred flat glass fibers is able to improve the mechanical properties and also the gloss once more relative to the molding compositions containing round glass fibers.

The invention claimed is:

1. A thermoplastic molding composition consisting of:
   (A) 30-84.9 wt % of a thermoplastic polymer mixture consisting of
      (A1) 50-90 wt % of a semiaromatic, semicrystalline polyamide or of a mixture of such polyamides,
      (A2) 5-50 wt % of a polyphenylene ether or of a mixture of such polyphenylene ethers,
      (A3) 0-40 wt % of a semicrystalline, aliphatic polyamide or of a mixture of such polyamides,
      (A1)-(A3) adding up to 100 wt % of component (A), with the proviso that the sum of (A2) and (A3) accounts for 10 to 50 wt % of component (A);
   (B) 15-60 wt % of glass fibers;
   (C) 0.1-10 wt % of LDS additive or of a mixture of LDS additives, at least one LDS additive being composed wholly or partly of inorganic compounds of copper and/or of tin;
   (D) 0-40 wt % of particulate filler other than (C);
   (E) 0-5 wt % of further, different additives;
   the sum of (A)-(E) making up 100 wt %.

2. The molding composition as claimed in claim 1, wherein at least one of the components (A2) or (A3), are grafted.

3. The molding composition as claimed in claim 1, wherein the ratio of (A2) to (A3) is in the range from 4:1 to 1:4.

4. The molding composition as claimed in claim 1, wherein the semicrystalline, aliphatic polymer of the components (A3) is selected from the group consisting of: polyamide 6, polyamide 10, polyamide 11, polyamide 12, polyamide 1212, polyamide 1012, polyamide 1210, polyamide 46, polyamide 66, polyamide 612, polyamide 126, polyamide 106, polyamide 610, polyamide 1010, polyamide 614, polyamide 618, polyamide 1014, polyamide 1018, polyamide 1214, polyamide 1218 and also copolyamides or mixtures thereof;

and/or wherein the fraction of component (A3) within the 100 wt % of component (A) is in the range of 5-40 wt %.

5. The molding composition as claimed in claim 1, wherein the fraction of component (A) is in the range of 55-90 wt % or 37-80.5 wt %, and/or wherein the fraction of component (B) is in the range of 18-55 wt %, based on the sum of (A)-(E).

6. The molding composition as claimed in claim 1, wherein the polyphenylene ether of component (A2) is selected from the group consisting of the following: poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether or copolymers or mixtures thereof and/or wherein the fraction of component (A2) within the 100 wt % of component (A) is in the range of 10-45 wt % or 10-46 wt %.

7. The molding composition as claimed in claim 1, wherein at least one of the polyphenylene ethers of component (A2) is grafted with between 0.05 to 5% of maleic anhydride.

8. The molding composition as claimed in claim 1, wherein component (B) is a glass fiber of E glass with a circular cross section.

9. The molding composition as claimed in claim 1, wherein component (B) is a glass fiber or a mixture of glass fibers of E glass with a non-circular cross section.

10. The molding composition as claimed in claim 1, wherein component (B) is a high-strength glass fiber or a mixture of high-strength glass fibers with a circular or non-circular cross section and with a glass composition based essentially on the components silicon dioxide, aluminum oxide and magnesium oxide, with the fraction of magnesium oxide (MgO) being 5-15 wt % and the fraction of calcium oxide (CaO) being 0-10 wt %.

11. The molding composition as claimed in claim 1, wherein the semiaromatic, semicrystalline polyamide (A1) is formed from one or from a mixture of polyamides formed from:
- (A1_a): 50-100 mol % of at least one of aromatic terephthalic acid or naphthalenedicarboxylic acid, based on the total amount of dicarboxylic acids present, 0-50 mol % of an aliphatic dicarboxylic acid, and/or of a cycloaliphatic dicarboxylic acid and/or isophthalic acid;
- (A1_b): 80-100 mol % of at least one aliphatic diamine having 4-18 carbon atoms, based on the total amount of diamines present, 0-20 mol % of cycloaliphatic diamines, and/or araliphatic diamines, the percentage molar amount of dicarboxylic acids making 100% and the percentage molar amount of diamines making 100% in the polyamide (A1), and optionally from:
- (A1_c): aminocarboxylic acids and/or lactams.

12. The molding composition as claimed in claim 1, wherein the polyamide (A1) is selected from the group consisting of the following: PA 4T/4I, PA 4T/6I, PA 5T/5I, PA 6T/6, PA 6T/6I, PA 6T/6I/6, PA 6T/66, 6T/610, 6T/612, PA 6T/10T, PA 6T/10I, PA 9T, PA 10T, PA 12T, PA 10T/10I, PA10T/106, PA10T/610, PA10T/612, PA10T/66, PA10T/6, PA10T/1010, PA10T/1012, PA10T/12, PA10T/11, PA 6T/9T, PA 6T/12T, PA 6T/10T/6I, PA 6T/6I/6, PA 6T/6I/12 and also mixtures thereof.

13. The molding composition as claimed in claim 1, wherein the fraction of component (C) is in the range of 0.5-8 wt %, based in each case on the sum of (A)-(E).

14. The molding composition as claimed in claim 1, wherein component (C) comprises at least one LDS additive based on copper and/or tin or is formed entirely by an LDS additive based on copper and/or tin, selected from the following group: metal oxide, metal phosphate, including basic metal phosphate and/or metal hydroxide phosphate.

15. The molding composition as claimed in claim 1, wherein component (C) is an LDS additive selected from the group consisting of the following: copper chromium oxide, copper oxide, copper hydroxide phosphate, tin hydroxide phosphate, tin phosphate, copper phosphate, basic copper phosphates and tin phosphates, or mixtures thereof.

16. The molding composition as claimed in claim 1, wherein the fraction of component (D) is in the range of 0-25 wt % based in each case on the sum of (A)-(E).

17. The molding composition as claimed in claim 1, wherein component (D) is an inorganic white pigment, or a mixture of white pigments.

18. A process for producing a molding composition as claimed in claim 1, wherein in a first step component (A2) and/or component (A3), are grafted,
and subsequently in a second step this grafted component or these grafted components are combined and mixed with the remaining components (A1), (B) and (C) and also optionally (D) and/or (E).

19. A component, based on a molding composition according to claim 1.

20. The molding composition as claimed in claim 1, wherein a mixture of (A2) and (A3), are grafted, before being combined with the remaining components (A1), (B) and (C) and also optionally (D) and/or (E).

21. The molding composition as claimed in claim 1, wherein (A2) and/or (A3) are grafted with unsaturated anhydride, including maleic anhydride, itaconic anhydride, and/or with acrylic acid, methacrylic acid, maleic acid, monobutyl maleate, fumaric acid, aconitic acid or a mixture thereof.

22. The molding composition as claimed in claim 21, wherein, (A2) and/or (A3) are grafted in a degree of grafting in the range between 0.05 to 5 wt %, based on the weight of component (A2), of component (A3), or, in the case of the mixture, on the sum of (A2) and (A3).

23. The molding composition as claimed in claim 21, wherein, (A2) and/or (A3) are grafted in a degree of grafting in the range between 0.2 to 1.5 wt %, based the weight of component (A2), of component (A3), or, in the case of the mixture, on the sum of (A2) and (A3).

24. The molding composition as claimed in claim 1, wherein the ratio of (A1) to (A2) or of (A1) to the sum of (A2) and (A3) is in the range from 4:1 to 1:2.

25. The molding composition as claimed in claim 1, wherein the fraction of component (A3) within the 100 wt % of component (A) is in the range of 20-30 wt %.

26. The molding composition as claimed in claim 1, wherein the fraction of component (A) is in the range of 49-79 wt %, and/or wherein the fraction of component (B) is in the range of 25-40 wt %, based on the sum of (A)-(E).

27. The molding composition as claimed in claim 1, wherein the fraction of component (A2) within the 100 wt % of component (A) is in the range of 20-40 wt %.

28. The molding composition as claimed in claim 1, wherein at least one of the polyphenylene ethers of component (A2) is grafted with maleic anhydride between 0.2 to 1.5%.

29. The molding composition as claimed in claim 1, wherein component (B) is a glass fiber or a mixture of glass fibers of E glass with a non-circular cross section and with an axial ratio of the principal cross sectional axis to the secondary cross sectional axis of at least 2.5, or in the range of 2.5-6.

30. The molding composition as claimed in claim 1, wherein the semiaromatic, semicrystalline polyamide (A1) is formed from one or from a mixture of polyamides formed from:
- (A1_a): 50-100 mol % of aromatic terephthalic acid and/or naphthalenedicarboxylic acid, based on the total amount of dicarboxylic acids present, 0-50 mol % of an aliphatic dicarboxylic acid, having 6 to 12 carbon atoms, and/or of a cycloaliphatic dicarboxylic acid having 8 to 20 carbon atoms, and/or isophthalic acid;
- (A1_b): 80-100 mol % of at least one aliphatic diamine having 4-18 carbon atoms, having 6 to 12 carbon atoms, based on the total amount of diamines present, 0-20 mol % of cycloaliphatic diamines, having 6 to 20 carbon atoms, and/or araliphatic diamines, the percentage molar amount of dicarboxylic acids making 100% and the percentage molar amount of diamines making 100% in the polyamide (A1), and optionally from:
- (A1_c): aminocarboxylic acids and/or lactams having having 6 to 12 carbon atoms.

31. The molding composition as claimed in claim 1, wherein the fraction of component (C) is in the range of 1-6 wt %, based on the sum of (A)-(E).

32. The molding composition as claimed in claim 1, wherein component (C) comprises at least one LDS additive based on copper and/or tin or is formed entirely by an LDS additive based on copper and/or tin, selected from the following group: metal oxide, metal phosphate, including basic metal phosphate and/or metal hydroxide phosphate.

33. The molding composition as claimed in claim 1, wherein component (C) comprises at least one LDS additive or is formed entirely by an LDS additive selected from the following group: tin oxide; metal-doped or metal oxide-doped tin oxide; antimony-doped tin oxide; metal oxide-coated mica; mica coated with antimony-doped tin oxide; mixture of tin oxide and antimony oxide and optionally further metal oxides; spinels; copper chromium oxide; copper oxide; copper hydroxide; copper hydroxide phosphate; copper phosphate; basic copper phosphates; copper tin phosphate; basic copper tin phosphate; tin phosphate; basic tin phosphate; antimony-doped tin oxide, including those in combination with mica; or mixtures and combinations thereof.

34. The molding composition as claimed in claim 1, wherein the fraction of component (D) is in the range of 2-15 wt %, based on the sum of (A)-(E).

35. The molding composition as claimed in claim 1, wherein component (D) is an inorganic white pigment, selected from the group of barium sulfate, zinc oxide, zinc sulfide, lithopones and titanium dioxide, in the rutile or the anatase modification, or mixtures of such white pigments.

36. A process for producing a molding composition as claimed in claim 1, wherein in a first step component (A2) or component (A3), or a mixture of components (A2) and (A3), are grafted, with unsaturated anhydride, including maleic anhydride, itaconic anhydride, and/or with acrylic acid, methacrylic acid, maleic acid, monobutyl maleate, fumaric acid, aconitic acid or a mixture thereof, in a degree of grafting in the range between 0.05 to 5 wt %, based on the weight of component (A2), of component (A3), or, in the case of the mixture, on the sum of (A2) and (A3), and subsequently in a second step this grafted component or these grafted components are combined and mixed with the remaining components (A1), (B) and (C) and also optionally (D) and/or (E).

37. A process for producing a molding composition as claimed in claim 1, wherein in a first step component (A2) or component (A3), or a mixture of components (A2) and (A3), are grafted, with at least one of maleic anhydride, itaconic anhydride, and/or with acrylic acid, methacrylic acid, maleic acid, monobutyl maleate, fumaric acid, aconitic acid or a mixture thereof, in a degree of grafting in the range between 0.2 to 1.5 wt %, based on the weight of component (A2), of component (A3), or, in the case of the mixture, on the sum of (A2) and (A3), and subsequently in a second step this grafted component or these grafted components are combined and mixed with the remaining components (A1), (B) and (C) and also optionally (D) and/or (E).

38. A component with electrical conductor tracks, based on a molding composition according to claim 1.

39. A component according to claim 38, in the form of a casing or casing part for portable electronic devices, including PDAs, mobile telephones, telecommunications devices, casings or casing parts for personal computers, notebook computers, medical devices, including hearing devices, sensor technology, or RFID transponders or parts for the automotive sector, including airbag module, multi-function steering wheel.

* * * * *